(12) United States Patent
Lam

(10) Patent No.: US 7,727,406 B2
(45) Date of Patent: Jun. 1, 2010

(54) ULTRAVIOLET WATER STERILIZER

(76) Inventor: Ka Duk Lam, 5/F, 62 Hung To Road, Kwun Tong, Kowloon (HK)

( * ) Notice: Subject to any disclaimer, the term of this patent is extended or adjusted under 35 U.S.C. 154(b) by 1219 days.

(21) Appl. No.: 11/182,648

(22) Filed: Jul. 15, 2005

(65) Prior Publication Data

US 2007/0012883 A1    Jan. 18, 2007

(51) Int. Cl.
- *B08B 17/00* (2006.01)
- *A61L 2/00* (2006.01)
- *C02F 1/68* (2006.01)
- *B01D 17/06* (2006.01)
- *G01N 23/00* (2006.01)

(52) U.S. Cl. .................. 210/764; 422/1; 422/6; 422/23; 422/24; 422/105; 210/748; 210/749; 210/194; 210/348; 250/455.11

(58) Field of Classification Search ............ 422/1, 422/6, 23–24, 105; 210/748, 749, 764, 194, 210/348; 250/455.11
See application file for complete search history.

(56) References Cited

U.S. PATENT DOCUMENTS

| | | | | |
|---|---|---|---|---|
| 3,485,576 | A * | 12/1969 | McRae et al. .......... | 205/701 |
| 3,535,513 | A * | 10/1970 | Cirami .................. | 250/430 |
| 4,107,514 | A * | 8/1978 | Ellson .................. | 219/523 |
| 5,106,495 | A * | 4/1992 | Hughes ................. | 210/139 |
| 6,086,760 | A * | 7/2000 | Hoffa .................. | 210/205 |
| 6,110,424 | A * | 8/2000 | Maiden et al. ......... | 422/24 |
| 6,280,615 | B1 * | 8/2001 | Phillips et al. ........ | 210/198.1 |
| 7,081,225 | B1 * | 7/2006 | Hollander ............. | 422/24 |
| 7,125,485 | B2 * | 10/2006 | Hanbli ................ | 210/104 |
| 2003/0138346 | A1 * | 7/2003 | Gunn et al. .......... | 422/24 |
| 2004/0140269 | A1 | 7/2004 | Chang ................ | 210/748 |
| 2005/0016378 | A1 | 1/2005 | Yuen ................. | 96/16 |
| 2005/0016907 | A1 | 1/2005 | Yuen ................. | 210/143 |

* cited by examiner

*Primary Examiner*—Jill Warden
*Assistant Examiner*—Monzer R Chorbaji
(74) *Attorney, Agent, or Firm*—Ohlandt, Greeley, Ruggiero & Perle, LLP

(57) ABSTRACT

There is provided a water sterilizer. The water sterilizer includes an ultraviolet light source electrically connected to an electrical power source, a light-protective housing encasing the lamp and having an inlet and an outlet, and a pump to draw the water into the housing to expose the water to ultraviolet light. Electric power supplied to the ultraviolet light source has an operating potential of not greater than 24 Volts. There is also provided a method for water sterilization.

18 Claims, 9 Drawing Sheets

ULTRAVIOLET WATER STERILIZER

BACKGROUND OF THE INVENTION

1. Field of the Invention

The present invention relates to sterilization of water. More particularly, the present invention relates to sterilization of water using ultraviolet light.

2. Description of the Related Art

Ultraviolet (UV) sterilization is a method for sterilizing water by exposing the water to light having wavelengths in the ultraviolet range. Exposure to UV light kills algae, bacteria, parasites, yeast, mold and other unwanted organisms in the water. UV sterilization is particularly useful for aquariums and ponds, to maintain a safe environment for fish and other marine life. UV light includes wavelengths between about 400 nm and about 10 nm, and can be further divided into the bands UV-A, UV-B, and UV-C.

Among factors important for UV sterilization effectiveness are UV power and water exposure time. UV power, or wattage, must be sufficient to effectively sterilize the water, and will vary based on the amount of water to be sterilized. For example, 9-Watt and 24-Watt are common in aquariums, depending on the needs of the user.

Exposure time, or the length of time in which water is exposed to UV radiation during treatment, is proportional to effectiveness. Generally, it is preferable to increase the exposure time as much as possible. This is often accomplished by lengthening the UV lamp, coupled with restricting the speed of water passing through the UV radiation.

Current UV sterilizers, such as those used for aquariums or other bodies of water, must be located away from the water, to avoid safety hazards associated with the relatively high voltages involved in powering the UV light source. This requires additional tubing, plumbing or other conduits to draw water from the aquarium into the sterilizer assembly for sterilization, which decreases efficiency by separating the water from the UV light source and forcing radiation to propagate through additional layers of material. These additional components also increase both manufacturing and maintenance costs. Additionally, the external nature of UV sterilizers requires additional space outside of the space required for the aquarium or other body of water.

SUMMARY OF THE INVENTION

It is an object of the present invention to provide a UV sterilizer for sterilizing liquids, particularly water, in aquariums or other bodies of water.

It is an object of the present invention to provide a UV sterilizer that is safer than current UV sterilizers.

It is another object of the present invention to provide such a UV sterilizer that may be operated within a body of water.

It is a further object of the present invention to provide such a UV sterilizer that is more compact and efficient, and requires fewer components, than current UV sterilizers.

It is still a further object of the present invention to provide such a UV sterilizer that effectively utilizes low-voltage power sources.

It is yet another object of the present invention to provide such a UV sterilizer that maximizes exposure of water to UV radiation.

These and other objects of the present invention are achieved by a water sterilizer of the present invention. The water sterilizer includes an ultraviolet light source electrically connected to an electrical power source, a light-protective housing encasing the lamp and having an inlet and an outlet, and a pump to draw the water into the housing to expose the water to ultraviolet light. Electric power supplied to the ultraviolet light source has an operating potential, i.e., operating voltage, of not greater than 24 Volts. The present invention also provides a method for water sterilization.

DESCRIPTION OF THE INVENTION

Figure 1:
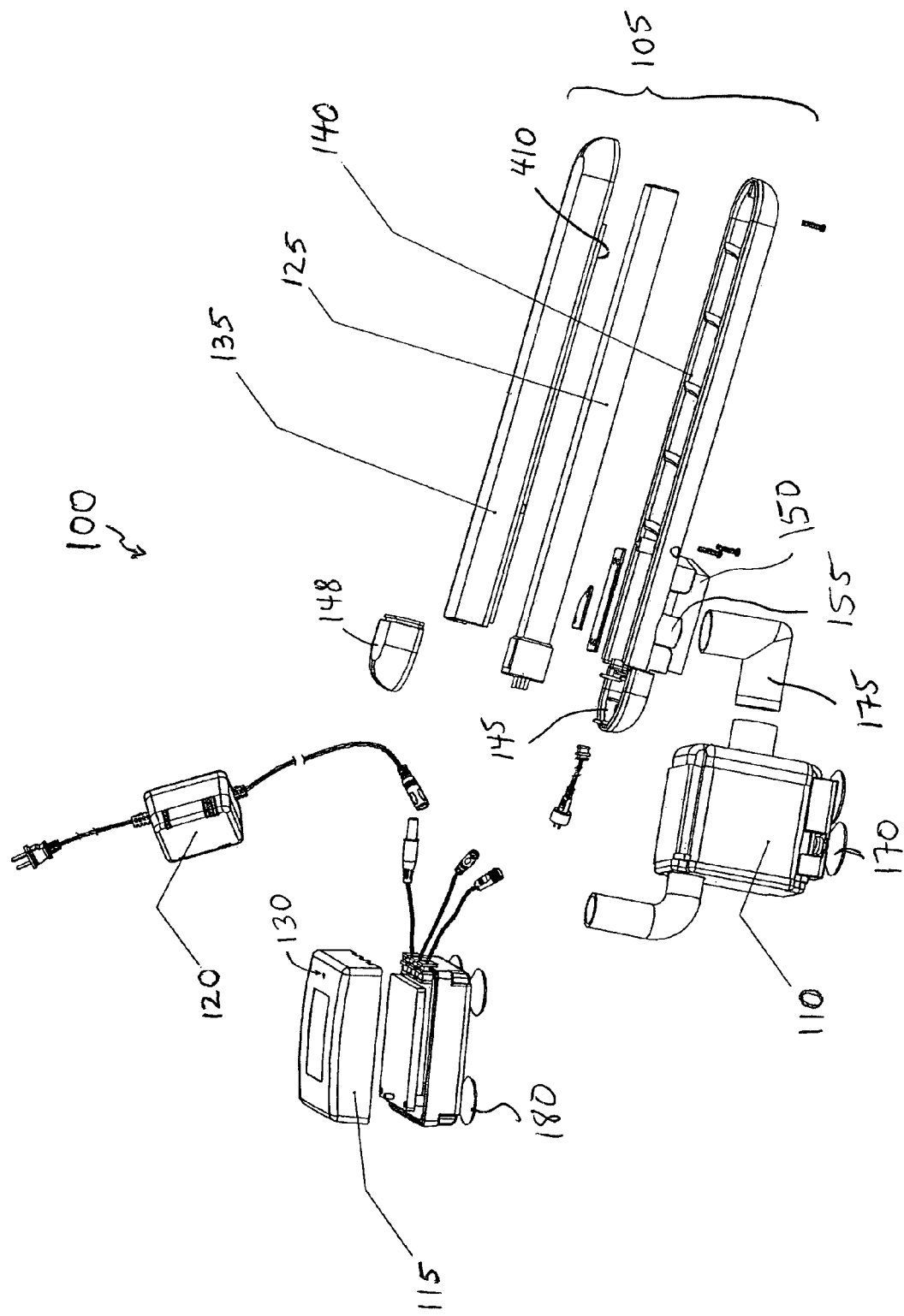
FIG. 1 is a perspective view of an embodiment of the UV sterilizer system of the present invention.

Referring to the drawings and, in particular, FIG. 1, there is provided an embodiment of the ultraviolet ("UV") sterilizer system of the present invention generally represented by reference numeral 100. Sterilizer system 100 includes a sterilizer housing 105, a pump 110, a control box 115, and an adaptor 120. A UV lamp 125 is encased and/or enclosed within housing 105. In the current embodiment, adaptor 120 is a 12-Volt adaptor, which is plugged into a standard 120-Volt power outlet (not shown).

Control box 115 distributes power from adaptor 120 to lamp 125 and pump 110. Control box 115 also includes an LED indicator 130 that indicates when lamp 125 is functioning, i.e., when current is flowing through lamp 125. In one embodiment, indicator 130 emits light only when lamp 125 is functioning properly and is emitting UV light.

Pump 110, in one embodiment, is a submersible pump that has an inductive motor and impellers for displacing liquids. Pump 110 can draw water through housing 105 at a fixed flow rate. In one embodiment, pump 110 draws water through housing 105 at a flow rate of about 430 liters/hour.

Housing 105 encases and/or encloses UV lamp 125 to form a passage, bounded by at least an interior surface of housing 105 and an exterior surface of lamp 125. The passage allows water to flow during exposure to UV radiation. Housing 105 is made of, or includes, an opaque material sufficient to prevent UV radiation from escaping housing 105 and thereby avoids potential eye or skin injury. Housing 105 is preferably made from a plastic material, and more preferably of a high-grade plastic.

Housing 105 is of a generally tubular shape, and includes upper housing portion 135, lower housing portion 140, lower cover 145, and upper cover 148. Lower housing portion 140 includes an inlet 150 that has one or more inlet orifices 350 (see FIG. 3A), and an outlet 155 that has one or more outlet orifices 355 (see FIG. 3A). In this preferred embodiment, inlet 150 is fitted with a filter, and pump 110 is connected to housing 105 via outlet 155. Housing portions 135 and 140, and covers 145 and 148 are all sealed together in a water-tight seal, so that water cannot enter or leave housing 105 through any means other than inlet 150 or outlet 155. Additional mechanical fasteners, such as screws, may also be included to enhance the bonding of the components of housing 105. In one embodiment, the interior surface of housing portions 135 and 140 are lined with a material that is reflective to UV light, to increase UV exposure.

Housing 105 is completely sealed and watertight, so that water cannot escape from housing 105 except through the inlet and outlet. The housing is also submersible in a body of water, such as an aquarium, during operation of the sterilizer.

Lamp 125 has an elongate shape and a size that is proportional to a size of housing 105, so that lamp 125 fits inside housing 105 leaving sufficient space through which a desired amount of water can flow.

Figure 2:
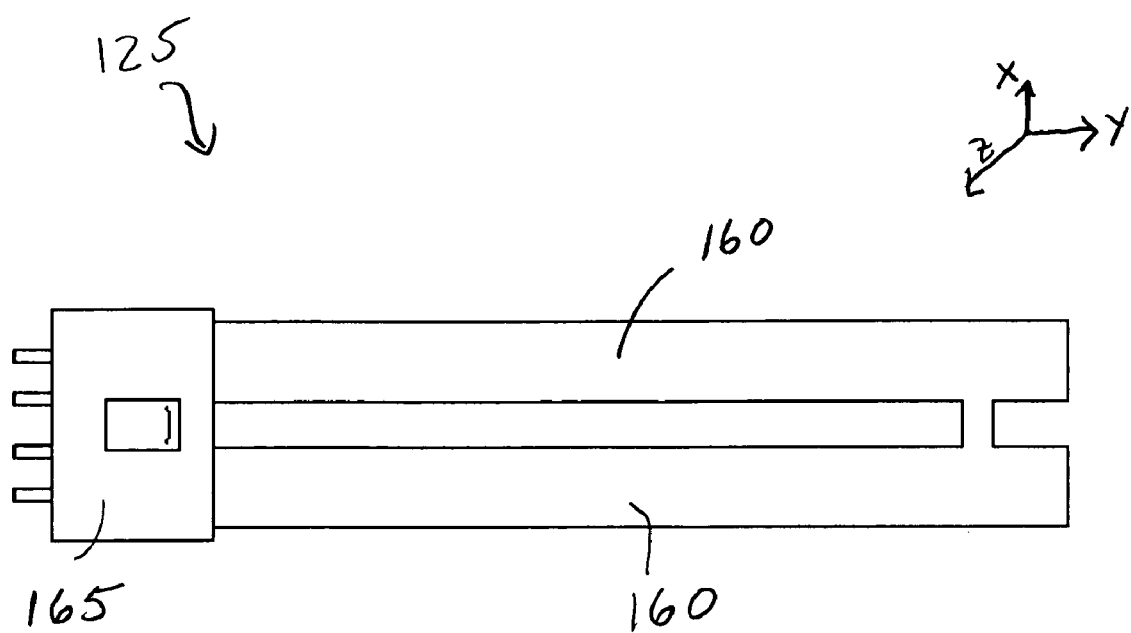
FIG. 2 is a top view, in the x-y plane, of a UV lamp shown in the embodiment of FIG. 1.

Referring to FIG. 2, UV lamp 125, in one embodiment, preferably has a power rating of 9 Watts or 24 Watts. Lamp 125 includes two bulbs 160 connected to a junction 165 for connection to control box 115. Bulbs 160 are tubular in shape, and are preferably hermetically sealed together near the end of each bulb to generally resemble a "H" shape. In another embodiment, lamp 125 includes a single, "U" shaped bulb. Lamp 125, and particularly junction 165, is secured to housing 105 to secure lamp 125 to housing. A sealant is applied to lamp 125 to secure lamp 125 and to prevent water from contacting junction 165. In one embodiment, at least electrical contacts in lamp 125 are sealed in a water-tight, non-conductive substance. In another embodiment, junction 165 is potted in epoxy so that water cannot penetrate any electric components or connections.

Figure 3A:
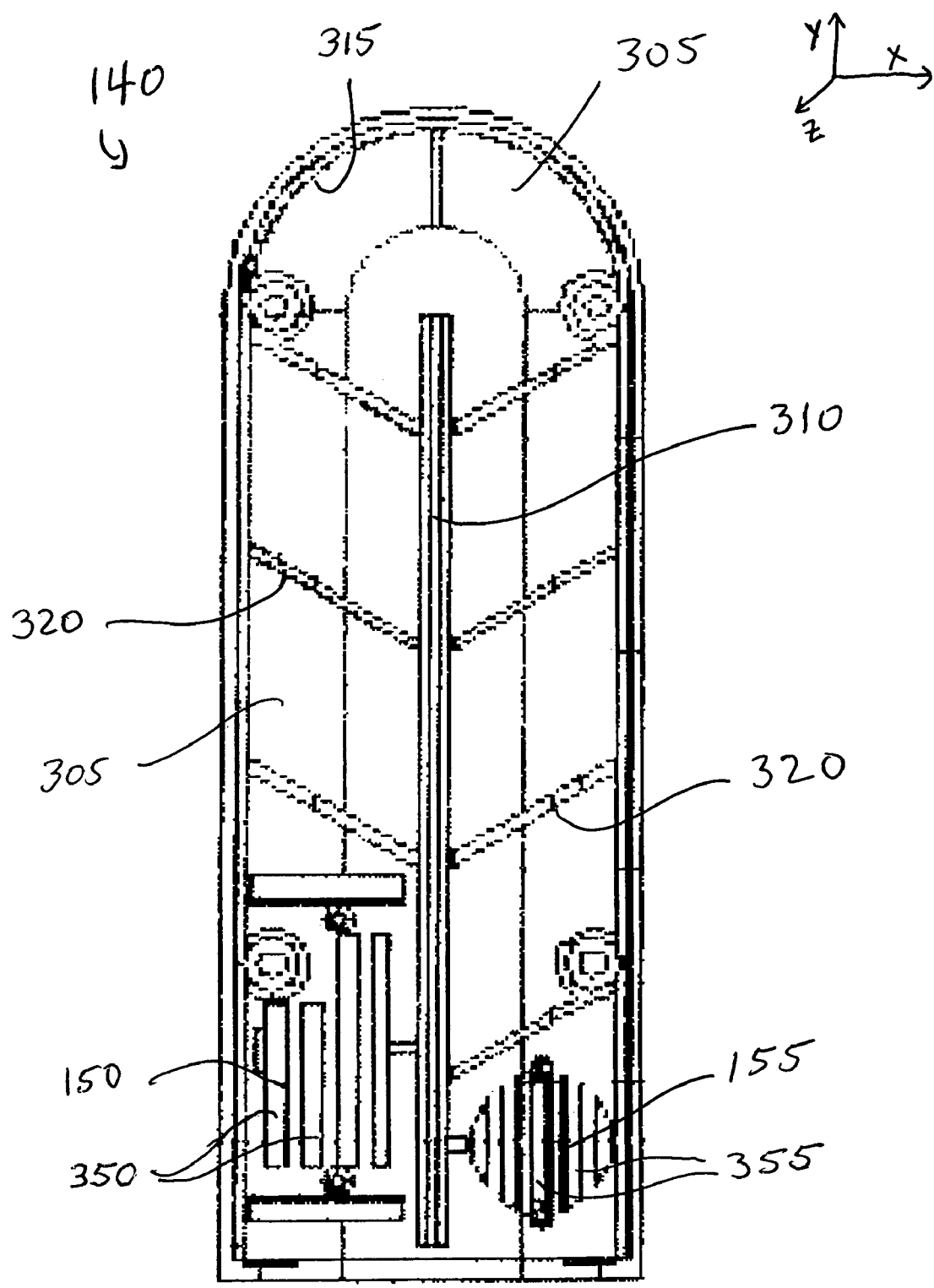
FIG. 3A is a top view, in the x-y plane, of a lower portion of the housing shown in the embodiment of FIG. 1.
Figure 3B:
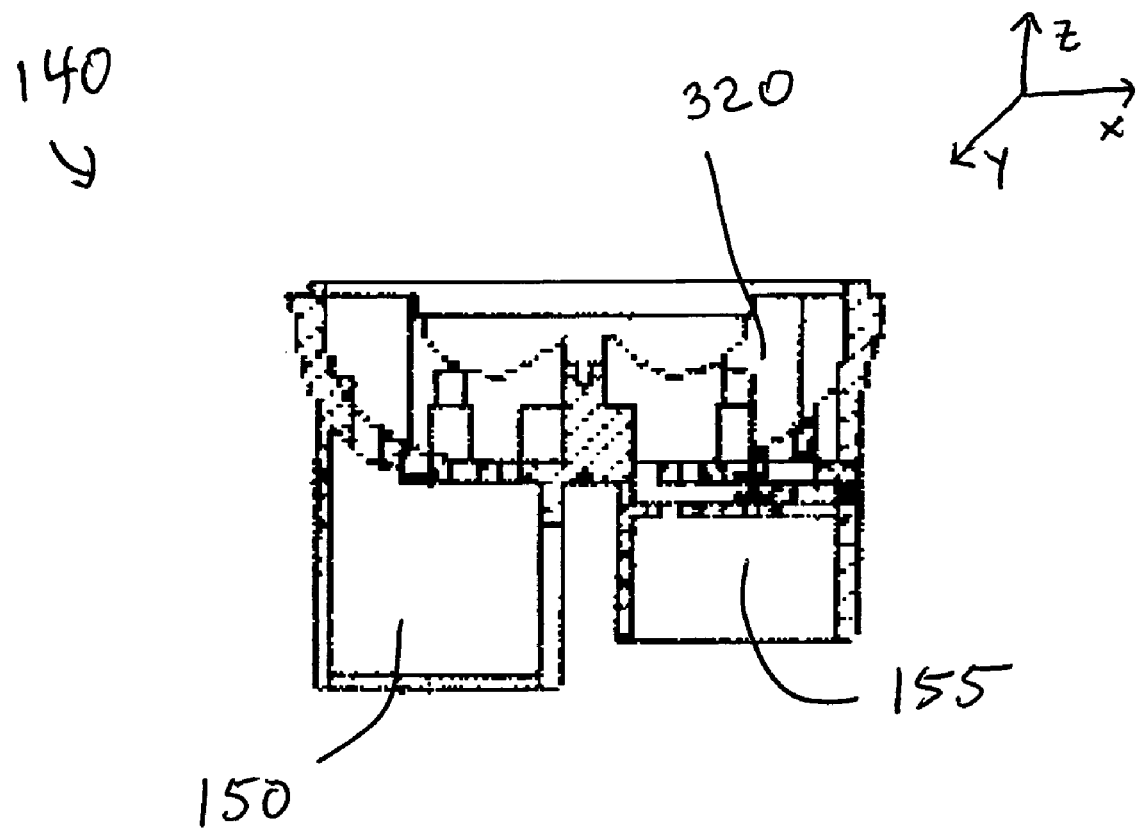
FIG. 3B is a front view, in the x-z plane, of the lower portion of the housing of FIG. 1.
Figure 3C:
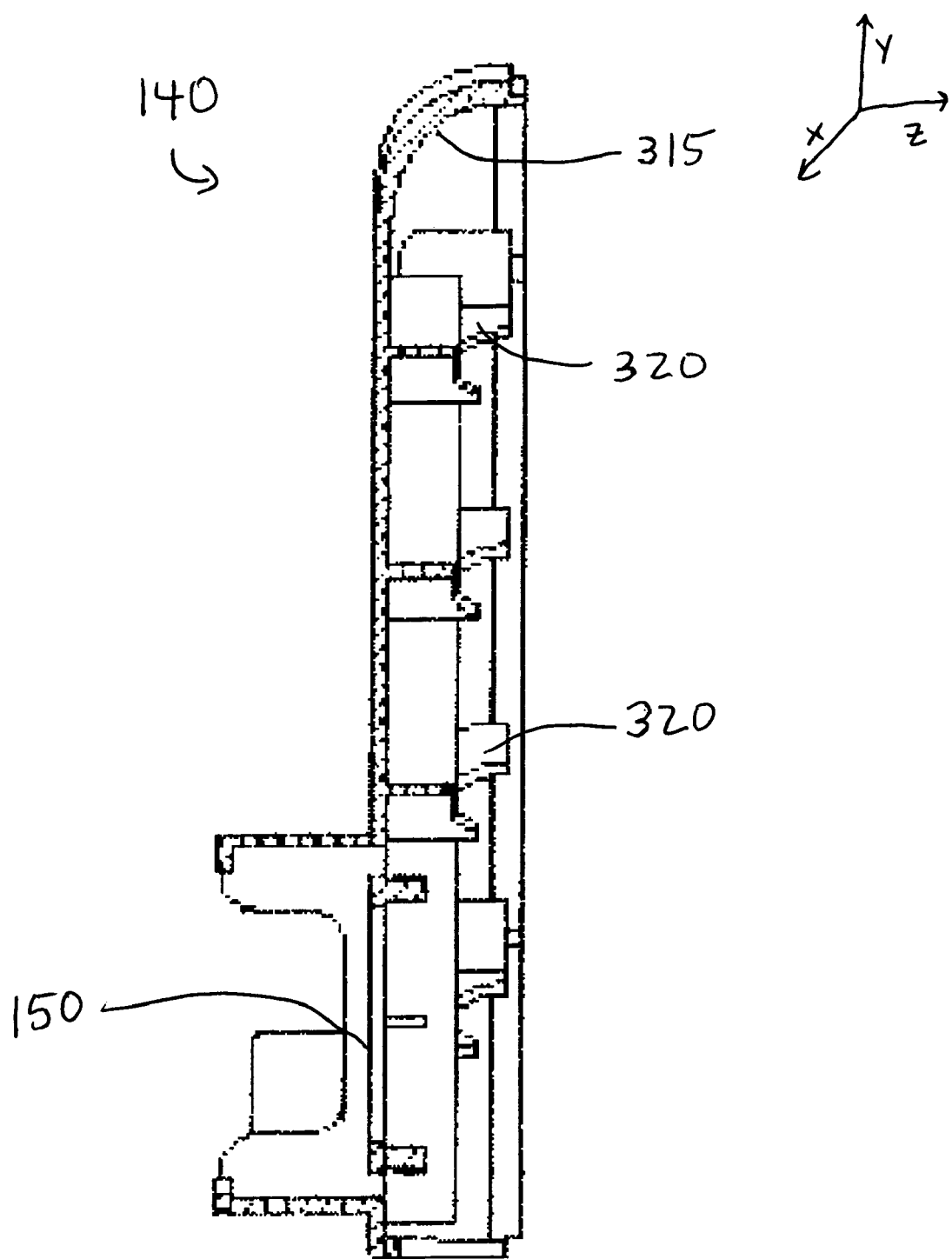
FIG. 3C is a side view, in the y-z plane, of the lower portion, showing the interior of the lower portion of FIG. 1.

Referring to FIGS. 3A-3C, inlet 150 and outlet 155 have a series of slits or narrow openings 350 and 355 to aid in restricting the flow of water traveling through a passage 305. Passage 305 is at least partially defined by interior surface 315 of lower portion 140. Lower portion 140 includes a lower central wall 310, which extends vertically from the bottom surface of lower housing portion 140 and extends along a portion of the length of lower housing portion 140, i.e., along a long axis of the lower housing portion 140.

In one embodiment, lower housing portion 140 also includes a series of protrusions, such as lower ridges 320, that cooperate with corresponding offset upper ridges 420 (see FIG. 4A) to impede the flow of water and create an alternating diagonal, turbulent flow. Lower ridges 320 protrude at least approximately perpendicular from interior surface 315.

Figure 4A:
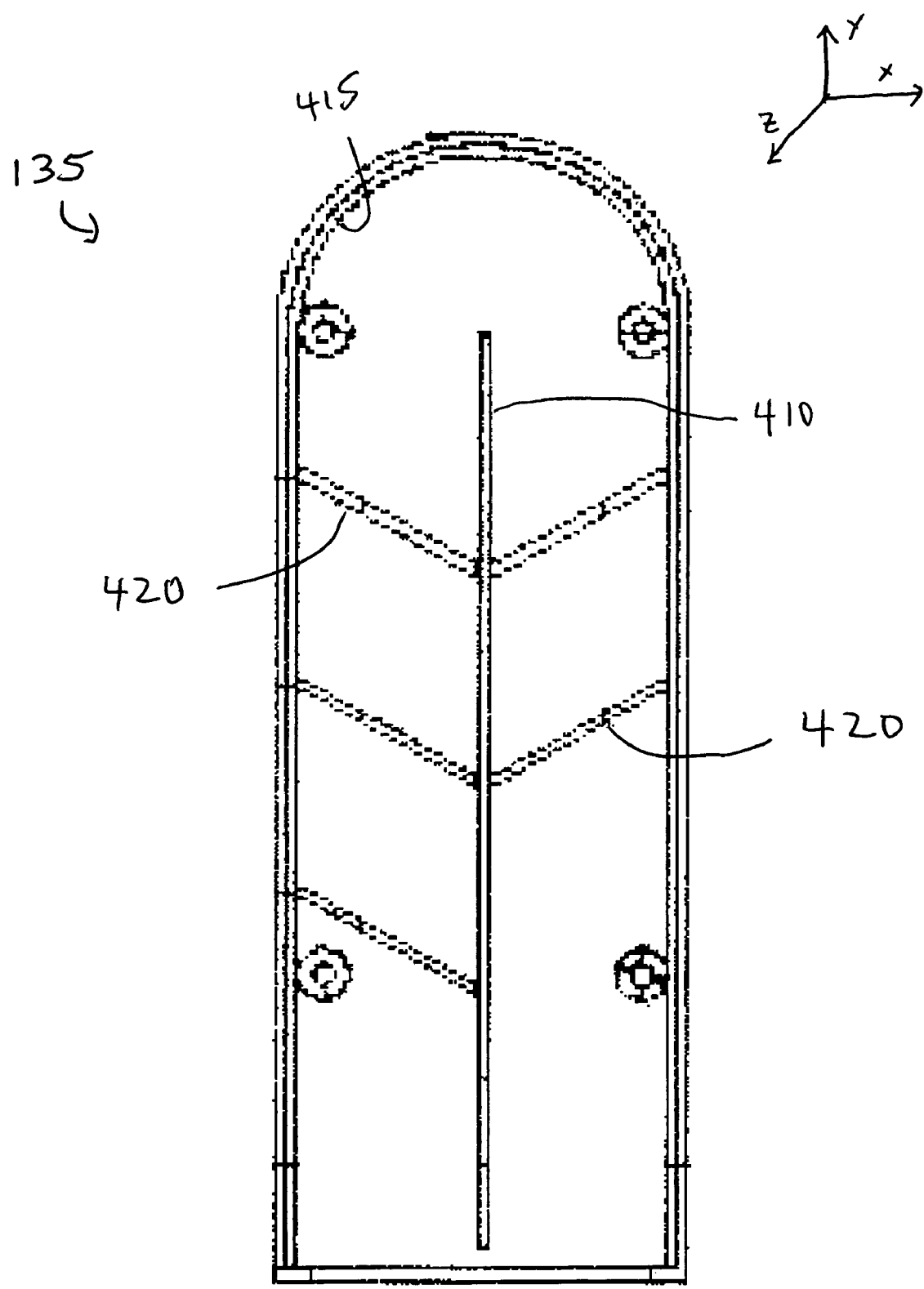
FIG. 4A is a top view, in the x-y plane, of an upper portion of the housing shown in the embodiment of FIG. 1.
Figure 4B:
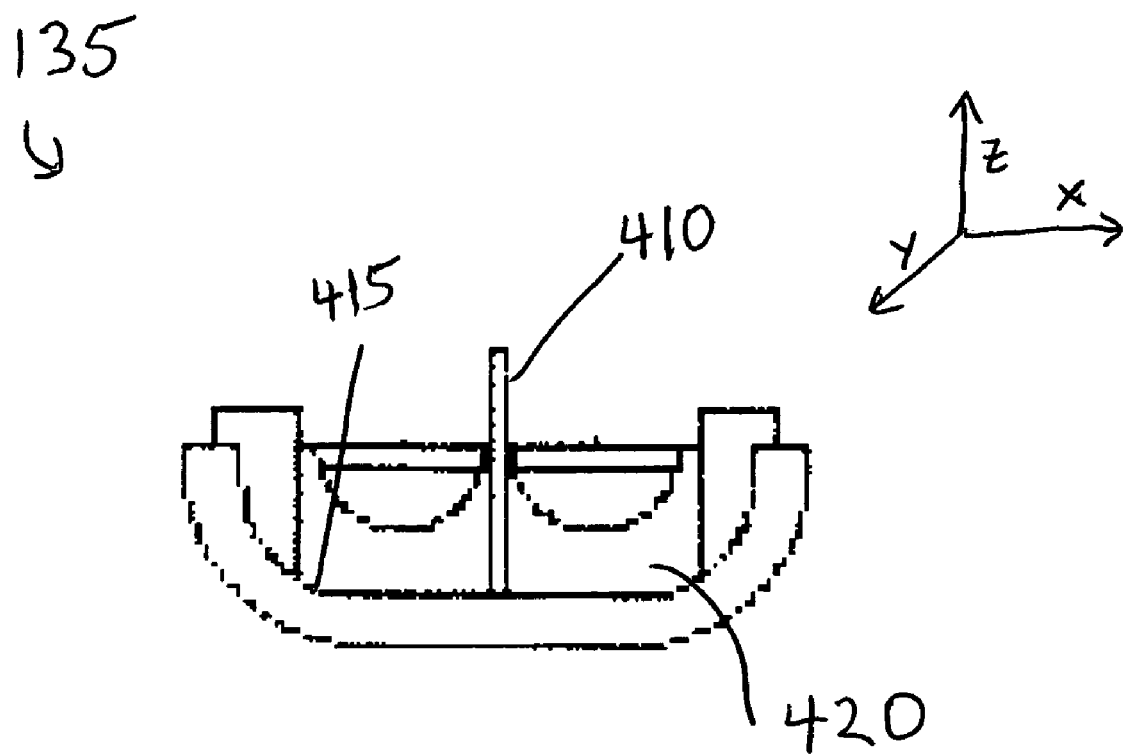
FIG. 4B is a front view, in the x-z plane, of the upper portion of the housing of FIG. 1.

Referring to FIGS. 4A and 4B, upper housing portion 135 has an interior surface 415, a central upper wall 410, and upper ridges 420. When upper housing portion 135 and lower housing portion 140 are joined, central upper wall 410 lines up with and at least substantially contacts lower central wall 310 to define a combined central wall 515 (see FIG. 5B) that extends along a length of housing 105. Passage 305 is at least partially defined by interior surface 315 of lower portion 140, interior surface 415 of upper portion 135, and combined central wall 515. Thus, passage 305 forms a U-shape, extending from inlet 155 to outlet 150.

Upper ridges 420 extend approximately perpendicular from interior surface 415. Both lower ridges 320 and upper ridges 420 are shaped to accommodate the tubular shape of bulbs 160 when upper housing portion 135 and lower housing portion 140 are joined around lamp 125. Both ridges 320 and 420 are preferably positioned at an angle relative to the direction of water through passage 305.

Thus, ridges 320 and 420 protrude into passage 305 to impede the progress of water as it travels through passage 305. Ridges 320 and 420 are vertically protruding walls that partially block passage 305. As shown in FIG. 4A, lower ridges 420 are preferably located along passage 305 at a position that is offset from the location of lower ridges 320, in a direction along passage 305.

Figure 5A:
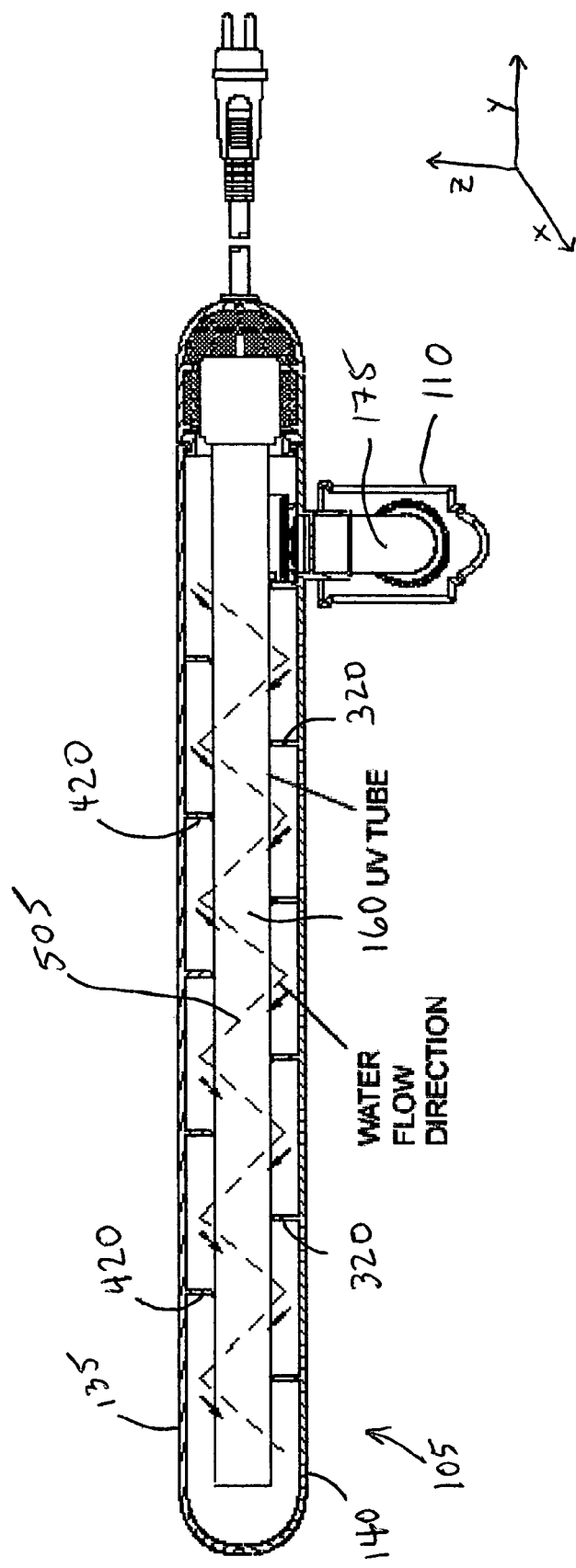
FIG. 5A is a side view, in the y-z plane, of the UV sterilizer housing shown in the embodiment of FIG. 1.
Figure 5B:
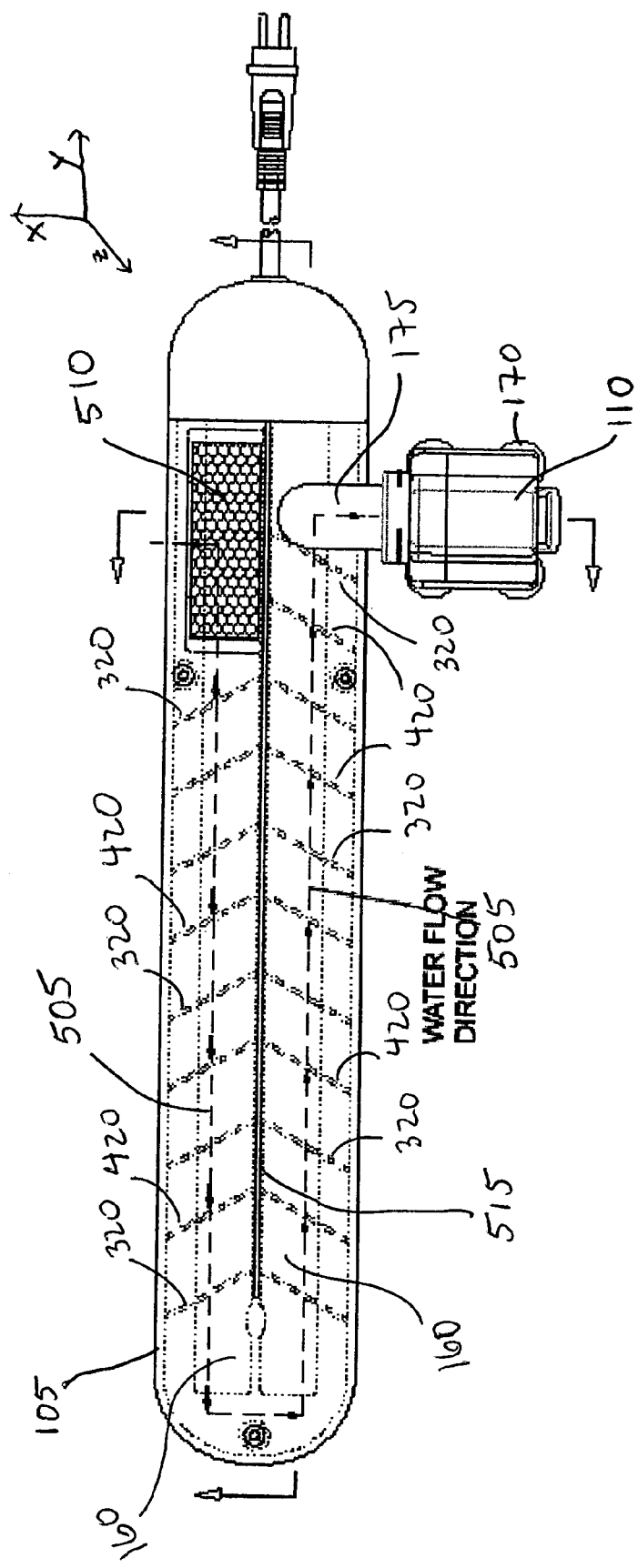
FIG. 5B is a bottom view, in the x-y plane, of the UV sterilizer housing of FIG. 1.

FIGS. 5A and 5B show housing 105 assembled in a water-tight seal, with water flow path 505 illustrated. FIG. 5A illustrates a side view of housing 105, and FIG. 5B illustrates a bottom view of housing 105. Because of the offset positioning of ridges 320 and 420, water flow path 505 travels in a "zig-zag", or alternating diagonal direction. This alternating diagonal movement increases the length of time in which water travels through passage 305 and contacts bulbs 160, and thus increases the amount of time in which water is exposed to UV radiation. Ridges 320 and 420 also create turbulence, i.e., a non-laminar flow, to increase sterilization efficiency. The turbulence forces particles in the water to deviate from a linear path and move toward bulbs 160.

FIG. 5B shows the alternating position of ridges 320 and ridges 420, that is achieved by offsetting ridges 320 and 420 relative to one another along passage 305. Water enters housing 105 through inlet 150, and in this embodiment, through plastic filter sponge 510 located at inlet 150. Water then travels along flow path 505 in a general U-shape through passage 305 defined by the interior surfaces 315 and 415, bulbs 160, and by combined central wall 515. Sterilized water then exits housing 105 through outlet 155 and through pump 110.

Thus, flow path 505 begins at inlet 150 at a first end of housing 105, and directs the water in a direction parallel to a length of lamp 125 toward a second end of housing 105, and thereafter directs the water from the second end toward the first end of housing 105 at outlet 155. Therefore, the water travels along the length of lamp 125 in a first direction, then travels along the length of lamp 125 a second time, in an opposite direction. This path of the water increases the amount of UV radiation exposure experienced by the water before the water exits through outlet 155.

As is shown in FIGS. 5A and 5B, water flows through passage 305 and directly contacts the surface of bulbs 160. Because of factors including the sealed end of lamp 125, particularly junction 165, the water-tight nature of glass, and the low operating temperature of bulbs 160, water can safely directly contact bulbs 160. This ability increases the effectiveness of the irradiation and eliminates the need for an extra layer of material, such as extra tubing to direct water around or adjacent to lamp 125.

In one embodiment, pump 110 has suction pads 170 to allow pump 110 to be removably connected to an interior surface of an aquarium of other container of water. Pump 110 is connected to outlet 155 via pipe 175. In this configuration, pump 110 supports housing 105 in a submerged position in an aquarium. Control box 115 may also be fitted with suction pads 180 so that control box can be removably connected to the exterior of the aquarium. Thus, sterilizer system can be positioned so that it is substantially submerged within an aquarium and affixed to the aquarium with no external pipes or plumbing.

A method for water sterilization is also provided. The method includes the steps of connecting lamp 125, sealed within waterproof housing 105, to an electric power source, drawing water from a container into housing 105 and through passage 305 formed by housing 105 and lamp 125. Water is exposed to UV light in order to sterilize the water. The sterilized water is then returned to the container. The electric power source provides an operating voltage not greater than 24 Volts. In one embodiment, the method also includes submerging housing 105 in the container during sterilization.

The present invention provides a device and method for sterilizing water. The device includes a UV light source, such as a lamp, electrically connected to an electric power source, a light-protective housing, and a pump to draw the water into the housing to be exposed to ultraviolet radiation. The light-protective housing completely surrounds and/or encases the UV light source, and includes an inlet for allowing water to enter the housing and an outlet for allowing water to leave the housing. In one embodiment, electric power supplied to said ultraviolet light source has an operating voltage of not greater than 24 Volts. In one embodiment, the housing forms a passage so that water is directed along a path inside the housing and the water is in direct contact with the lamp, to expose the water to ultraviolet light. Preferably, the UV light source is a UV lamp. In one embodiment, the UV light has a wavelength of about 254 nm.

In one embodiment, a water sterilizer is provided that includes an ultraviolet light source, and an electric power source connected to the light source. The electric power source has an output of not greater than 24 volts.

In another embodiment, the operating voltage provided by the power source to the sterilizer is not greater than 24 Volts. In a preferred embodiment, the operating voltage provided by the power source to the sterilizer is 12 Volts.

In one embodiment, a water sterilizer is provided that includes an ultraviolet light source, a light-protective housing surrounding the light source and having an inlet and an outlet, a pump to draw the water from a container into the housing, and an electric power source electrically connected to the light source. The housing forms a passage to direct water along a path inside the housing. The housing is sealed around the light source and is submersible in the container during operation of the sterilizer.

The present invention is useful in sterilizing liquids, particularly water. The invention has particular utility in both salt water and fresh water aquariums, ponds and other contained bodies of water. The UV sterilizer and method is effective in reducing disease-causing agents in the water. The invention reduces suspended algae, bacteria and pathogen levels. It also reduces water cloudiness, and improves water quality, for example, for aquarium inhabitants. The improved water quality also aids introduction of new fish or other inhabitants into an aquarium.

Lamp housing 105 may be submerged directly into a body of water. This feature results in better efficiency, since no extra plumbing or tubing is necessary to direct water toward the inlet of the sterilizer. Thus, the system has fewer components, reducing both manufacturing and maintenance costs, and also making it more user friendly for the novice aquarium user. The system also eliminates the risk of external leakage, as the entire water bearing structure is located within the water container. The system is also less obtrusive and takes up less space, as a substantial part of the system can be positioned inside the treated body of water.

The low voltage quality of the system is an important safety aspect that substantially decreases the risk of injury to an operator or inhabitants of an aquarium. The fact that the housing is sealed, and that at least connector 165 is potted in a non-conductive sealant further enhances the safety of the system. These safety features are important especially when a user has his hands submerged.

The system is also very user-friendly, and thus allows amateurs to effectively use the system with minimal risk and expertise. Previous systems, due to their relatively high voltage and complexity, generally are preferred by those with a level of expertise, thus discouraging the casual aquarium owner from using a UV sterilizer system. Amateurs can readily use the system, in which electrical contacts are sealed and protected, and there is no external plumbing to install or assemble.

Also, because water directed through housing 105 directly contacts the UV lamp 125, the system is more efficient, because the water experiences greater exposure to radiation. Furthermore, the series of offset protrusions 320 and 420 both slows the water flow and increases the distance traveled through the housing, thus increasing the amount of time during which the water is exposed to radiation. In addition, the increased distance allows the housing and UV lamp to be shorter in length, allowing housing 105 to be shorter and thus more compact without sacrificing effectiveness. Furthermore, the turbulent flow created by protrusions 320 and 420 forces particles proximate to bulbs 160. These factors all contribute to the increased efficiency and effectiveness of the above-described UV sterilizer system.

It should be understood that various alternatives, combinations and/or modifications of the teachings described herein could be devised by those skilled in the art. The present invention is intended to embrace all such alternatives, modifications and variances that fall within the scope of the appended claims.

What is claimed is:

1. A water sterilizer, comprising:
   an ultraviolet light source electrically connected to an electrical power source;
   a light-protective housing having a lower housing portion and an upper housing portion, said housing encasing said ultraviolet light source and having an inlet and an outlet, said housing and said ultraviolet light source forming a passage bounded by at least an interior surface of said housing and an exterior surface of said ultraviolet light source, said lower housing portion having a lower plurality of planar ridges extending into said passage and said upper housing portion having an upper plurality of planar ridges extending into said passage, each of said lower and upper plurality of planar ridges having a first surface extending from said housing opposite a second surface extending from said housing and having an edge surface therebetween, said first surface being parallel to said second surface; and
   a pump to draw said water into said housing to expose said water to ultraviolet light.

2. The water sterilizer of claim 1, wherein said ultraviolet light source is an ultraviolet light emitting lamp.

3. The water sterilizer of claim 1, wherein said passage directs water along a path inside said housing so that said water is in direct swirling or tumbling contact with said ultraviolet light source, to expose said water to ultraviolet light.

4. The water sterilizer of claim 1, wherein said power source is less than a 24-volt power source.

5. The water sterilizer of claim 1, wherein said housing is watertight, wherein said ultraviolet light source includes electrical contacts that are sealed in a water-tight, non-conductive substance, and wherein said housing is submersible in a body of water during operation of said sterilizer.

6. The water sterilizer of claim 1, wherein said housing is removably connected to an interior wall or an exterior wall of an aquarium or other water container.

7. The water sterilizer of claim 1, wherein said ultraviolet light source is a lamp having an elongate shape and a size that is proportional to a size of said housing.

8. The water sterilizer of claim 7, wherein said lamp includes two tubular bulbs hermetically sealed together at one end.

9. The water sterilizer of claim 7, wherein: said inlet and said outlet are positioned at a first end of said housing, wherein said passage commences at said inlet and directs said water in a direction parallel to a long axis of said lamp toward a second end of said housing, and thereafter directs said water from said second end toward said first end at said outlet, and wherein said water travels along said length in a first direction, and travels again along said length in a second direction, before exiting through said outlet.

10. The water sterilizer of claim 1, further comprising a filter located at said inlet.

11. The water sterilizer of claim 1, wherein said pump is located at said outlet.

12. The water sterilizer of claim 1, wherein said plurality of upper ridges are offset from said plurality of lower ridges along said passage so that said path includes an alternating diagonal component in a direction approximately perpendicular to said passage.

13. The water sterilizer of claim 1, wherein said housing is made of an opaque plastic material.

14. The water sterilizer of claim 1, wherein said ultraviolet light has a wavelength of about 254 nm.

15. The water sterilizer of claim 1, further comprising an LED indicator light to indicate when said ultraviolet light source is operating.

16. The water sterilizer of claim 1, wherein said interior surface of said housing includes a material that is reflective to ultraviolet light.

17. The water sterilizer of claim 1, wherein said plurality of ridges each are shaped to accommodate a tubular shape of said ultraviolet light source.

18. A water sterilizer, comprising:

an ultraviolet light source electrically connected to an electrical power source;

a light-protective housing having a lower housing portion and an upper housing portion, said housing encasing said ultraviolet light source to form a passage bounded by at least an interior surface of said housing and an exterior surface of said ultraviolet light source, said housing having an inlet and an outlet, said lower housing portion having a lower plurality of planar ridges extending into said passage and said upper housing portion having an upper plurality of planar ridges extending into said passage; and a pump to draw said water into said housing to expose said water to ultraviolet wherein said upper housing portion has a central upper wall extending into said passage that lines up with and at least substantially contacts a lower central wall extending into said passage from said lower housing portion to define a combined central wall that extends along a length of said housing between said upper plurality of planar ridges and said lower plurality of planar ridges.

* * * * *